United States Patent
Kelly et al.

(10) Patent No.: US 10,937,072 B2
(45) Date of Patent: Mar. 2, 2021

(54) TAXIMETER, SYSTEM AND METHOD FOR A TAXI

(71) Applicant: Taxiprop Pty Ltd, East Sydney (AU)

(72) Inventors: Peter Francis Kelly, East Sydney (AU); Spiro John Chellos, Alexandria (AU); John Philip D'Arcy, Warrawee (AU); John William Young, East Sydney (AU)

(73) Assignee: TAXIPROP PTY LTD, East Sydney (AU)

( * ) Notice: Subject to any disclaimer, the term of this patent is extended or adjusted under 35 U.S.C. 154(b) by 45 days.

(21) Appl. No.: 16/511,563

(22) Filed: Jul. 15, 2019

(65) Prior Publication Data

US 2019/0385201 A1 Dec. 19, 2019

Related U.S. Application Data

(63) Continuation of application No. 14/648,459, filed as application No. PCT/AU2013/001388 on Nov. 29, 2013, now Pat. No. 10,354,299.

(30) Foreign Application Priority Data

Nov. 30, 2012 (AU) .................................. 2012905266
Apr. 11, 2013 (AU) .................................. 2013901235

(51) Int. Cl.
*G06Q 30/02* (2012.01)
*G07B 13/00* (2006.01)
*G06Q 20/32* (2012.01)
*G06Q 20/40* (2012.01)
*G07B 15/06* (2011.01)
*H04W 4/02* (2018.01)

(52) U.S. Cl.
CPC ..... *G06Q 30/0284* (2013.01); *G06Q 20/3278* (2013.01); *G06Q 20/40* (2013.01); *G07B 13/00* (2013.01); *G07B 15/06* (2013.01); *H04W 4/02* (2013.01); *G06Q 2240/00* (2013.01)

(58) Field of Classification Search
CPC .......... G06Q 2240/00; G06Q 30/0284; G06Q 20/3278; H04W 4/02; G07B 15/06
See application file for complete search history.

(56) References Cited

U.S. PATENT DOCUMENTS

| 2004/0112959 A1* | 6/2004 | Jun ....................... G07B 13/04 235/384 |
| 2009/0049119 A1* | 2/2009 | Marcinkiewicz ....... H04L 67/06 709/203 |
| 2011/0161140 A1* | 6/2011 | Polt ...................... G07B 15/063 705/13 |

(Continued)

Primary Examiner — A. Hunter Wilder
(74) Attorney, Agent, or Firm — K&L Gates LLP

(57) ABSTRACT

A taximeter, system and method for a taxi are disclosed. In one aspect, the taximeter includes a processing system including a memory having stored therein a plurality of computer applications, wherein the processing system is configured to execute a meter application during a passenger trip to determine a fare due, and execute a payment application to facilitate electronic payment of the fare due. In particular embodiments, the taximeter establishes a wireless data communication session with a mobile device of the passenger to facilitate payment of the fare due via the mobile device.

14 Claims, 4 Drawing Sheets

(56) References Cited

U.S. PATENT DOCUMENTS

2011/0301985 A1* 12/2011 Camp .............. G06Q 10/06311
                                                    705/5
2012/0032834 A1*  2/2012 Weeks .............. G08B 13/1436
                                                    342/118
2013/0275307 A1* 10/2013 Khan ................... G06Q 20/40
                                                    705/64
2014/0067195 A1*  3/2014 James .................. G06Q 10/02
                                                    701/32.4

* cited by examiner

TAXIMETER, SYSTEM AND METHOD FOR A TAXI

CROSS-REFERENCE TO RELATED APPLICATIONS

The present application is a continuation application of U.S. patent application Ser. No. 14/648,459 filed on May 29, 2015, which is the US National Phase under 35 USC § 371 of International Patent Application No. PCT/AU2013/001388, filed on Nov. 29, 2013, which claims priority from Australian Provisional Patent Application Nos. 2012905266 filed on 30 Nov. 2012 and 2013901235 filed on 11 Apr. 2013, the content of which is incorporated herein by reference herein for all purposes.

TECHNICAL FIELD

The present invention relates to a taximeter, system and a method of operating the same for a taxi.

BACKGROUND

There are a number of components for determining the fare due and facilitating payment in a taxi. For example, the system includes a payment engine, and payment device (commonly referred to as a payment PIN pad) and a meter device. It has been found that there is a lack of integration between these components of the payment system for taxis which makes the task of installing and operating the device difficult. Additionally, the current payment technology in a taxi is limited in relation to the taxi trip and fare information that can be provided to customers, networks and operators. Furthermore, non-cash payment of fares is difficult utilising the current payment technology. A number of manual processes are required from the passenger and the taxi driver in order for the transaction to be successfully completed with non-cash payments. Moreover, it is difficult for audits of payments for taxi fares to be conducted for passengers, operators and networks. In addition, in the event that the user wishes to authorise payment of the fare wirelessly using a mobile device such as a mobile telephone, there are difficulties in ensuring that the mobile telephone establishes a wireless data connection with the correct payment system, particularly in areas where there may be more than one taxi within a wireless proximity of the mobile telephone.

Therefore, there is a need to at least alleviate one or more of the above-mentioned problems or provide a commercial alternative.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

This summary is provided to introduce a selection of concepts in a simplified form that are further described below in the Preferred Embodiments. This summary is not intended to identify key features or essential features of the claimed subject matter, nor is it intended to be used to limit the scope of the claimed subject matter.

In a first aspect there is provided a taximeter for use in a taxi, wherein the taximeter includes a processing system including a memory having stored therein a plurality of computer applications, wherein the processing system is configured to:
  execute a meter application during a passenger trip to determine a fare due; and
  execute a payment application to facilitate electronic payment of the fare due.

In certain embodiments, the taximeter includes a touch screen display operable to display one or more interfaces of the plurality of computer applications and to receive input for operating at least one of the plurality of computer applications.

In certain embodiments, the taximeter includes or is to be in communication with one or more sensors, wherein the memory is arranged to store operational data indicative of sensed signals.

In certain embodiments, the one or more sensors include an accelerometer, wherein the operational data is indicative of a proper acceleration of the taximeter in the taxi.

In certain embodiments, the operational data is indicative of the proper acceleration of the taximeter which is greater than a proper acceleration threshold.

In certain embodiments, the one or more sensors include one or more passenger detection sensors operable to detect a passenger entering or exiting the taxi.

In certain embodiments, the one or more passenger detection sensors include one or more door latch sensors.

In certain embodiments, the one or more passenger detection sensors include one or more pressure sensors operable to sense a passenger sitting in a passenger seat in the taxi.

In certain embodiments, the taximeter includes a NFC reader is operable to communicate with a NFC enabled device.

In certain embodiments, the NFC reader is operable to communicate with a payment instrument including a NFC chip, wherein the payment application is operable to facilitate payment of the fare due based upon the data sensed from the payment instrument.

In certain embodiments, the taximeter includes an optical sensor operable to scan indicia indicative of a payment request, wherein the payment application is operable to use the payment request to facilitate electronic payment of the fare due.

In certain embodiments, the indicia is:
  printed media; or
  an electronically displayed graphic.

In certain embodiments, the taximeter includes a geographical positioning unit operable to provide geographical coordinates of the taxi during the trip, wherein the geographical coordinates are time-stamped.

In certain embodiments, the memory is arranged to have stored therein toll data indicative of associated entry and exit areas for tolled areas, wherein the processing system is operable to automatically detect using the recorded geographical coordinates whether the taxi has passed through associated entry and exit areas of a tolled area, wherein in response to the detection, the meter application is operable to modify the fare due to include a toll amount associated with the respective tolled area.

In certain embodiments, the processing system is operable to determine the duration between the taxi passing through the detected entry and exit areas against one or more temporal thresholds, wherein in the event that the duration satisfies the one or more temporal thresholds, the meter application is operable to modify the fare due according to the associated toll amount.

In certain embodiments, the temporal threshold is a temporal range, wherein in response to the processing system determining that the duration is within the temporal range, the meter application is arranged to modify the fare due with the toll amount accordingly.

In certain embodiments, the taximeter receives encoder pulses from an encoder associated with tyres of the taxi, wherein the taximeter is configured to:
  determine a first distance travelled by the taxi using the geographical coordinates;
  determine a second distance travelled using the pulses received from the encoder; and
  determine, based on a discrepancy between the first distance and the second distance, whether a discrepancy threshold has been satisfied, wherein in response to a positive determination, the processing system outputs a message indicative of the taximeter requiring reconfiguration.

In certain embodiments, the taximeter is operable to be configured by a portable configuration storage device connectable to an interface of the taximeter.

In certain embodiments, the taximeter includes a communication device operable to enable wireless communication with one or more remote devices.

In certain embodiments, the taximeter is operable to establish a data communication connection with a mobile device associated with the passenger which is used for facilitating payment of the fare due.

In certain embodiments, after the data communication connection is established, the taximeter is operable to receive an authorisation data object from the mobile device authorising payment of the fare due, wherein the authorisation data object is associated with an account associated with the passenger and maintained by the server processing system, wherein the taximeter is operable to transfer the authorisation data object to the server processing system for the passenger's account to be debited according to the fare due.

In certain embodiments, the authorisation data object is indicative of an expiration deadline, wherein the taximeter is operable to perform a validation of the authorisation data object based on the expiration deadline to determine if the authorisation data object has expired, and in the event of the authorisation data object has expired, to transfer data to the mobile device indicating that the authorisation data object has expired.

In a second aspect there is provided a system including:
  the taximeter according to the first aspect; and
  a server processing system in data communication with the taximeter.

In certain embodiments, the server processing system has access to a server data store having stored therein trip data and payment data recorded by the taximeter, wherein the server processing system is configured to:
  receive a request for an electronic receipt relating to a trip from a requesting device; and
  transfer to the requesting device an electronic receipt indicative of the trip data and payment data associated with the trip, wherein the trip data and payment data are retrieved from the server data store.

In certain embodiments, the electronic receipt is indicative of the route of the trip.

In certain embodiments, the route of the trip is indicated by a map.

In certain embodiments, the server processing system hosts a reporting portal for reporting at least some of the data recorded by the taximeter of the taxi and stored in the server data store, wherein the server processing system is configured to:
  receive, from a requesting device, a request to report at least some of the data recorded by the taximeter associated with the respective taxi;
  generate a report based upon data stored in the server data store; and
  transfer the report to the requesting device.

In certain embodiments, the system includes a mobile application executed upon a mobile device associated with the passenger, wherein the passenger interacts with the mobile application to facilitate payment of the fare due, wherein the mobile device, under control of the mobile application, communicates with at least one of the taximeter and the server processing system to facilitate payment of the fare.

In certain embodiments, the mobile device is configured by the mobile application to:
  generate, based upon received wireless signals, a list of a plurality wireless devices able to communicate with the mobile device;
  determine a received signal strength indicator for each wireless device;
  discriminate between the plurality wireless devices based upon the received signal strength indicators to determine one of the wireless devices as the taximeter; and
  facilitate in establishing a wireless data communication session with the wireless device determined as the taximeter in order to enable the passenger to authorise payment of the fare due via the mobile device.

In certain embodiments, the mobile device is configured by the mobile application to:
  determine a transmitting power level for each wireless device; and
  discriminate between the plurality of wireless devices further using the transmitting power level for each wireless device to determine one of the wireless device as the taximeter.

In certain embodiments, the mobile device is configured by the mobile application to:
  determine a calibrated transmitting power level for each wireless device; and
  discriminate between the plurality of wireless devices further using the calibrated transmitting power level for each wireless device to determine one of the wireless device as the taximeter.

In certain embodiments, after the data communication connection is established, the taximeter receives an authorisation data object from the mobile device authorising payment of the fare due, wherein the authorisation data object is associated with an account associated with passenger and maintained by the server processing system, wherein the taximeter transfers the authorisation data object to the server processing system for the passenger's account to be debited according to the fare due.

In certain embodiments, the authorisation data object is indicative of an expiration deadline, wherein the taximeter performs a validation of the authorisation data object based on the expiration deadline to determine if the authorisation data object has expired, and in the event of the authorisation data object has expired, transferring data to the mobile device indicating that the authorisation data object has expired.

In a third aspect there is provided computer executable instructions stored in memory of a mobile device associated with a passenger for authorising payment of a fare due with a taximeter associated with a taxi, wherein the mobile device includes a processor operable to communicate with the memory and a transceiver, wherein the mobile device's processor is operable to:

generate in the mobile device's memory, based upon received wireless signals, a list of a plurality wireless devices able to communicate with the mobile device, wherein one of the wireless devices is the taximeter;
  determine a received signal strength indicator for each wireless device;
  discriminate between the plurality of wireless devices based upon the received signal strength indicators to determine one of the wireless devices as the taximeter; and
  facilitate in establishing a wireless data communication session with the wireless device determined as the taximeter in order to enable the passenger to authorise payment of the fare due via the mobile device.

In certain embodiments, the mobile device's processor is operable to:

determine a transmitting power level for each wireless device; and
  discriminate between the plurality of wireless devices further using the transmitting power level for each wireless device to determine one of the wireless devices as the taximeter.

In certain embodiments, the mobile device is operable to receive, via the mobile device's transceiver, the transmitting power level from each wireless device.

In certain embodiments, the mobile device is operable to determine a calibrated transmitting power level for each wireless device, wherein each calibrated transmitting power level is indicative of a transmitting power level of the respective wireless device which is adjusted according to a calibration factor.

In certain embodiments, the mobile device is operable to receive, via the mobile device's transceiver, the calibrated transmitting power level for each wireless device.

In certain embodiments, the mobile device is operable to receive from each wireless device, via the mobile device's transceiver, a calibration factor and a transmitting power level, wherein the mobile device's processor is operable to:

determine a calibrated transmitting power level using the calibration factor and the transmitting power level; and
  discriminate between the plurality of wireless devices further based upon the calibrated transmitting power level for each wireless device to determine one of the wireless devices as the taximeter.

In certain embodiments, the mobile device's processor is operable to log in the mobile device's memory data indicative of one or more advertisement messages received from the plurality of wireless devices and a time which at least some of the advertisement messages were received by the mobile device, wherein the mobile device's processor is operable to:

determine a period of time which each wireless device has been broadcasting to the mobile device; and
  discriminate between the plurality of wireless devices further based upon the period of time each wireless device has been broadcasting to the mobile device to determine one of the wireless devices as the taximeter.

In certain embodiments, the mobile device's processor is operable to discriminate between the plurality of wireless devices by generating a score, using one or more scoring rules stored in the mobile device's memory, for each wireless device, wherein one of the wireless devices is identified as the taximeter based on the respective score.

In certain embodiments, the mobile device's processor is operable to facilitate in establishing a secure wireless data communication session with the taximeter.

In certain embodiments, the mobile device is operable to determine a device identifier associated with each wireless device based on the received wireless signals, wherein the mobile device's memory has stored therein a taxi network device identifier, wherein the mobile device's processor is operable to remove one or more wireless devices from the list which have a device identifier which does not correspond to the taxi network device identifier.

In a fourth aspect there is provided a system for use by a taxi, wherein the system includes:

the computer executable instructions according to the third aspect; and
  the taximeter mounted within the taxi including a processor in communication with a transceiver and a memory having stored therein executable instructions which configure the processor to facilitate electronic payment of the fare due, wherein the taximeter is operable to:
    wirelessly broadcast, via the taximeter's transceiver, an advertisement message indicating that the taximeter is available for establishing a wireless data communication session; and
    facilitate in establishing a wireless data communication session with the mobile device in order to receive authorisation for electronic payment of the fare due from the mobile device operated by the passenger.

In certain embodiments, the taximeter includes a geographical positioning unit that is operable to be in communication with the taximeter's processor, wherein the taximeter's processor is operable to obtain a plurality of geographical coordinates from the geographical positioning unit during the trip and to record trip data indicative of the plurality of geographical coordinates in the taximeter's memory, wherein each geographical coordinate is time-stamped.

In certain embodiments, the taximeter's processor is operable to compare one of the geographical coordinates obtained from the geographical positioning unit against a most recently recorded geographical coordinate stored in the taximeter's memory, wherein in the event that geographical coordinates are substantially similar, the taximeter processor is operable to not record the obtained geographical coordinate in the taximeter's memory.

In certain embodiments, the mobile device includes an output device operable to communicate with the mobile device's processor, wherein after the wireless data communication session is established between the taximeter and the mobile device, the taximeter is operable to wirelessly transfer trip data indicative of a route of the trip to the mobile device, and wherein the mobile device's output device is operable to present the route using the trip data.

In certain embodiments, the taximeter's memory has stored therein toll data indicative of associated entry and exit areas for one or more tolled areas and a respective one or more toll amounts, wherein the taximeter processor is operable to automatically detect, using the recorded geographical coordinates, whether the taxi has passed through one of the associated entry and exit areas of one of the one or more tolled areas, wherein in response to the detection, the taximeter's processor is operable to modify the fare due to include the respective toll amount.

In certain embodiments, the taximeter's processor is operable to:
- determine a duration between time-stamps of the respective geographical coordinates associated with the detected entry and exit areas;
- compare the duration against one or more temporal thresholds stored in the taximeter's memory; and
- modify the fare due according to the associated toll amount in the event that the duration satisfies the one or more temporal thresholds.

In certain embodiments, each temporal threshold is a temporal range, wherein in response to the taximeter's processor determining that the duration is within the temporal range, the taximeter's processor is operable to modify the fare due to include the associated toll amount.

In certain embodiments, the mobile device's memory has stored therein an authorisation data object, wherein the authorisation data object is generated by a server processing system and transferred to the mobile device, wherein after the wireless data communication session is established the taximeter is operable to receive the authorisation data object from the mobile device authorising payment of the fare due, wherein the authorisation data object is indicative of an account associated with the passenger and maintained by the server processing system, wherein the taximeter is operable to transfer the authorisation data object to the server processing system for authorising the passenger's account to be debited according to the fare due.

In certain embodiments, the authorisation data object is indicative of an expiration deadline, wherein the taximeter's processor is operable to perform a validation of the authorisation data object based on the expiration deadline to determine if the authorisation data object has expired, and in the event of the authorisation data object has expired, to transfer data to the mobile device indicating that the authorisation data object has expired.

In certain embodiments, the system includes the mobile device.

In a fifth aspect there is provided a method for enabling a passenger to authorise payment of the fare due from a taximeter via a mobile device associated with the passenger, wherein the mobile device includes a processor in communication with memory and a transceiver, wherein the method includes:
- the mobile device's processor generating in the mobile device's memory, based upon received wireless signals, a list of a plurality wireless devices able to communicate with the mobile device, wherein one of the wireless devices is the taximeter;
- the mobile device's processor determining a received signal strength indicator for each wireless device;
- the mobile device's processor discriminating between the plurality wireless devices based upon the received signal strength indicators to determine one of the wireless devices as the taximeter; and
- the mobile device's processor facilitating in establishing a wireless data communication session with the wireless device determined as the taximeter in order to enable the passenger to authorise payment of the fare due via the mobile device.

In certain embodiments, the method includes:
the mobile device's processor determining a transmitting power level for each wireless device; and
the mobile device's processor discriminating between the plurality of wireless devices further using the transmitting power level for each wireless device to determine one of the wireless device as the taximeter.

In certain embodiments, the method includes the mobile device receiving, via the mobile device's transceiver, the transmitting power level from each wireless device.

In certain embodiments, the method includes the mobile device determining a calibrated transmitting power level from each wireless device, wherein each calibrated transmitting power level is indicative of a transmitting power level of the respective wireless device which is adjusted according to a calibration factor.

In certain embodiments, the method includes the mobile device receiving, via the mobile device's transceiver, the calibrated transmitting power level.

In certain embodiments, the mobile device receives from each wireless device, via the mobile device's transceiver, a calibration factor and a transmitting power level, wherein the method includes:
- the mobile device's processor determining a calibrated transmitting power level using the calibration factor and the transmitting power level; and
- the mobile device's processor discriminating between the plurality of wireless devices further based upon the calibrated transmitting power level for each wireless device to determine one of the wireless devices as the taximeter.

In certain embodiments, the mobile device's processor logs in the mobile device's memory data indicative of advertisement messages received from the plurality of wireless devices and a time which at least some of the advertisement messages were received by the mobile device, wherein the method includes:
- the mobile device's processor determining a period of time which each wireless device has been broadcasting to the mobile device; and
- the mobile device's processor discriminating between the plurality of wireless devices further based upon the period of time each wireless device has been broadcasting to the mobile device to determine one of the wireless device as the taximeter.

In certain embodiments, the method includes the mobile device's processor discriminating between the plurality of wireless devices by generating a score, using one or more scoring rules stored in the mobile device's memory, for each wireless device, wherein one of the wireless devices is identified as the taximeter based on the respective score.

In certain embodiments, the method includes the mobile device's processor facilitating in establishing a secure wireless data communication session with the taximeter.

In certain embodiments, the advertising message includes a taxi network identifier, wherein the mobile device's memory has stored therein the taxi network identifier, wherein the method includes the taximeter's processor removing one or more wireless devices from the list which fail to be indicative of the taxi network identifier.

In certain embodiments, the method includes:
- the mobile device's processor determining a device identifier associated with each wireless device based on the received wireless signals, wherein the mobile device's memory has stored therein a taxi network device identifier; and
- the mobile device's processor removing one or more wireless devices from the list which have a device identifier which does not correspond to the taxi network device identifier.

In certain embodiments, the taximeter includes a processor in communication with a transceiver and a memory having stored therein executable instructions which configure the processor to facilitate electronic payment of the fare due, wherein the method includes:

the taximeter's transceiver wirelessly broadcasting an advertisement message indicating that the taximeter is available for establishing a wireless data communication session; and the taximeter processor facilitating in establishing a wireless data communication session with the mobile device in order to receive authorisation for electronic payment of the fare due from the mobile device operated by the passenger.

In certain embodiments, the taximeter includes a geographical positioning unit that is in communication with the taximeter's processor, wherein the method includes:

the taximeter's processor obtaining a plurality of geographical coordinates from the geographical positioning unit during the trip; and the taximeter's processor recording in the taximeter's memory trip data indicative of the geographical coordinates, wherein each geographical coordinate is time-stamped.

In certain embodiments, the method includes the taximeter's processor comparing one of the geographical coordinates obtained from the geographical positioning unit against a most recently recorded geographical coordinate stored in the taximeter's memory, wherein in the event that geographical coordinates are substantially similar, the taximeter processor does not record the obtained geographical coordinate in taximeter's memory.

In certain embodiments, the mobile device includes an output device in communication with the mobile device's processor, wherein after the wireless data communication session is established between the taximeter and the mobile device, the method includes the taximeter wirelessly transferring the trip data to the mobile device, and wherein the mobile device's output device presents a route of the taxi using the trip data.

In certain embodiments, the taximeter's memory has stored therein toll data indicative of associated entry and exit areas for one or more tolled areas and a respective one or more toll amounts, wherein the method includes the taximeter's processor automatically detecting, using the recorded geographical coordinates, whether the taxi has passed through one of the associated entry and exit areas of one of the one or more tolled areas, wherein in response to the detection, the taximeter's processor modifies the fare due to include the respective toll amount.

In certain embodiments, the method includes:

the taximeter's processor determining a duration between time-stamps of the respective geographical coordinates associated with the detected entry and exit areas;

the taximeter's processor comparing the duration against one or more temporal thresholds stored in the taximeter's memory; and the taximeter's processor modifying the fare due according to the associated toll amount in the event that the duration satisfies the one or more temporal thresholds.

In certain embodiments, each temporal threshold is a temporal range, wherein in response to the taximeter's processor determining that the duration is within the temporal range, the method includes the taximeter's processor modifying the fare due to include the associated toll amount.

In certain embodiments, the mobile device's memory has stored therein an authorisation data object, wherein the authorisation data object is generated by a server processing system and transferred to the mobile device, wherein after the wireless data communication session is established the method includes:

the taximeter receiving the authorisation data object from the mobile device authorising payment of the fare due, wherein the authorisation data object is indicative with an account associated with the passenger and maintained by the server processing system; and the taximeter transfers the authorisation data object to the server processing system for authorising the passenger's account to be debited according to the fare due.

In certain embodiments, the authorisation data object is indicative of an expiration deadline, wherein the method includes:

the taximeter's processor performing a validation of the authorisation data object based on the expiration deadline to determine if the authorisation data object has expired; and the taximeter's processor transferring data to the mobile device indicating that the authorisation data object has expired in the event of the authorisation data object is determined to have expired.

In a sixth aspect there is provided a taximeter mounted within the taxi including a processor in communication with a transceiver, a geographical positioning unit and a memory having stored therein: executable instructions which configure the processor to calculate a fare due by a passenger; toll data indicative of associated entry and exit areas for one or more tolled areas; and a respective one or more toll amounts, and one or more temporal thresholds for the associated entry and exist areas;

wherein:

the taximeter's processor is operable to obtain a plurality of geographical coordinates from the geographical positioning unit during a trip for the passenger in the taxi, wherein the geographical coordinates are time-stamped;

the taximeter's processor is operable to automatically detect, using the obtained geographical coordinates, whether the taxi has passed through one of the associated entry and exit areas of one of the one or more tolled areas;

the taximeter's processor is operable to determine a duration between time-stamps of the respective geographical coordinates associated with the detected entry and exit areas;

the taximeter's processor is operable to compare the duration against one or more temporal thresholds associated with the detected entry and exit areas; and the taximeter's processor is operable to modify the fare due according to the associated toll amount in the event that the duration satisfies the one or more temporal thresholds.

In certain embodiments, the taximeter is configured to:

wirelessly broadcast, via the taximeter's transceiver, an advertisement message indicating that the taximeter is available for establishing a wireless data communication session; and facilitate in establishing a wireless data communication session with a mobile device associated with a passenger in order to receive authorisation for electronic payment of the fare due from the mobile device operated by the passenger.

In certain embodiments, the taximeter is configured to record in memory trip data indicative of the geographical coordinates of a route for the passenger.

In certain embodiments, the taximeter's processor is operable to compare one of the geographical coordinates obtained from the geographical positioning unit against a most recently recorded geographical coordinate stored in the taximeter's memory, wherein in the event that geographical coordinates are substantially similar, the taximeter processor is operable to not record the obtained geographical coordinate in the taximeter's memory.

In certain embodiments, after the wireless data communication session is established between the taximeter and the mobile device, the taximeter is operable to wirelessly transfer trip data indicative of a route of the trip to the mobile device for presentation to the passenger.

In certain embodiments, each temporal threshold is a temporal range, wherein in response to the taximeter's processor determining that the duration is within the temporal range, the taximeter's processor is operable to modify the fare due to include the associated toll amount.

In certain embodiments, after the wireless data communication session is established the taximeter is operable to receive the authorisation data object from the mobile device authorising payment of the fare due, wherein the authorisation data object is indicative of an account associated with the passenger and maintained by the server processing system, wherein the taximeter is operable to transfer the authorisation data object to the server processing system for authorising the passenger's account to be debited according to the fare due.

In certain embodiments, the authorisation data object is indicative of an expiration deadline, wherein the taximeter's processor is operable to perform a validation of the authorisation data object based on the expiration deadline to determine if the authorisation data object has expired, and in the event of the authorisation data object has expired, to transfer data to the mobile device indicating that the authorisation data object has expired.

In certain embodiments, the taximeter receives encoder pulses from an encoder associated with tyres of the taxi, wherein the processor of the taximeter is configured to:
  determine a first distance travelled by the taxi using the geographical coordinates;
  determine a second distance travelled using the pulses received from the encoder; and
  determine, based on a discrepancy between the first distance and the second distance, whether a discrepancy threshold stored in memory has been exceeded, wherein in response to a positive determination, the processor determines that the taximeter requires reconfiguration.

Other aspects and embodiments will be appreciated throughout the detailed description of the preferred embodiments.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION OF EMBODIMENTS

Figure 1:
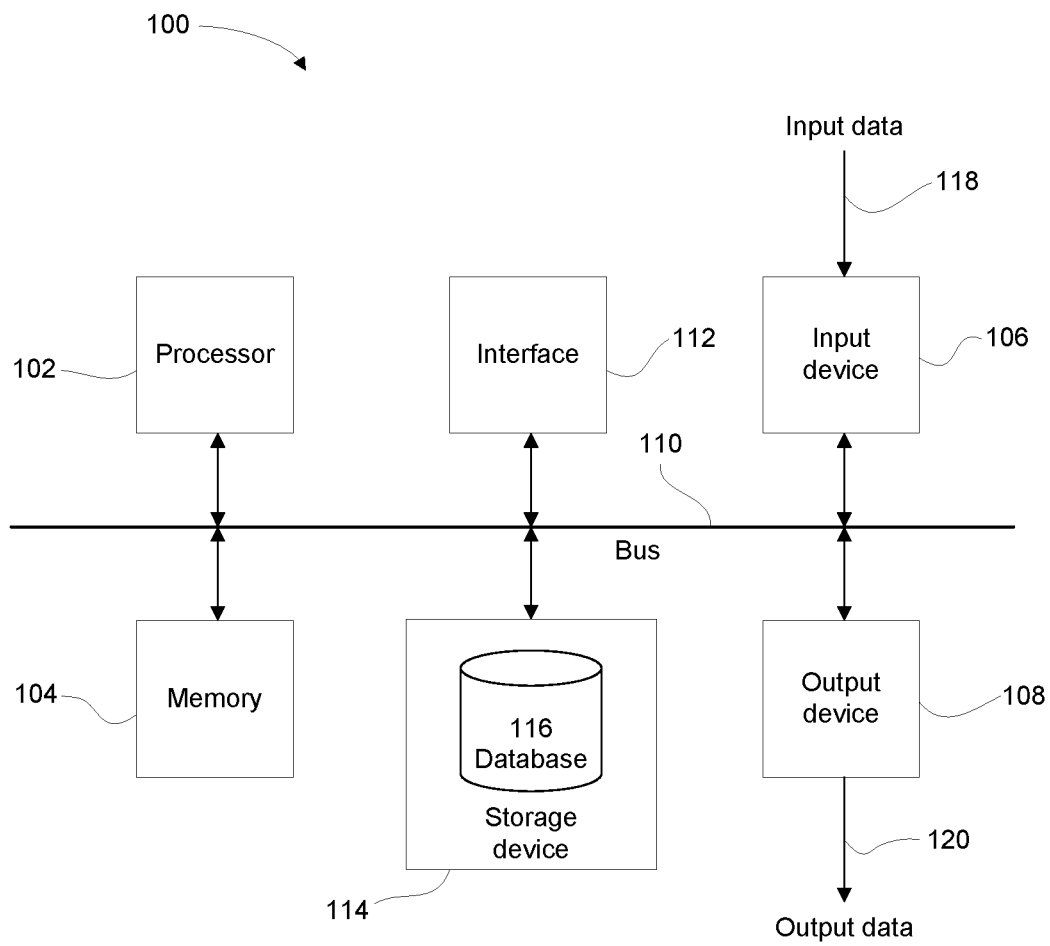
FIG. 1 illustrates a functional block diagram of an example processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

Figure 2:
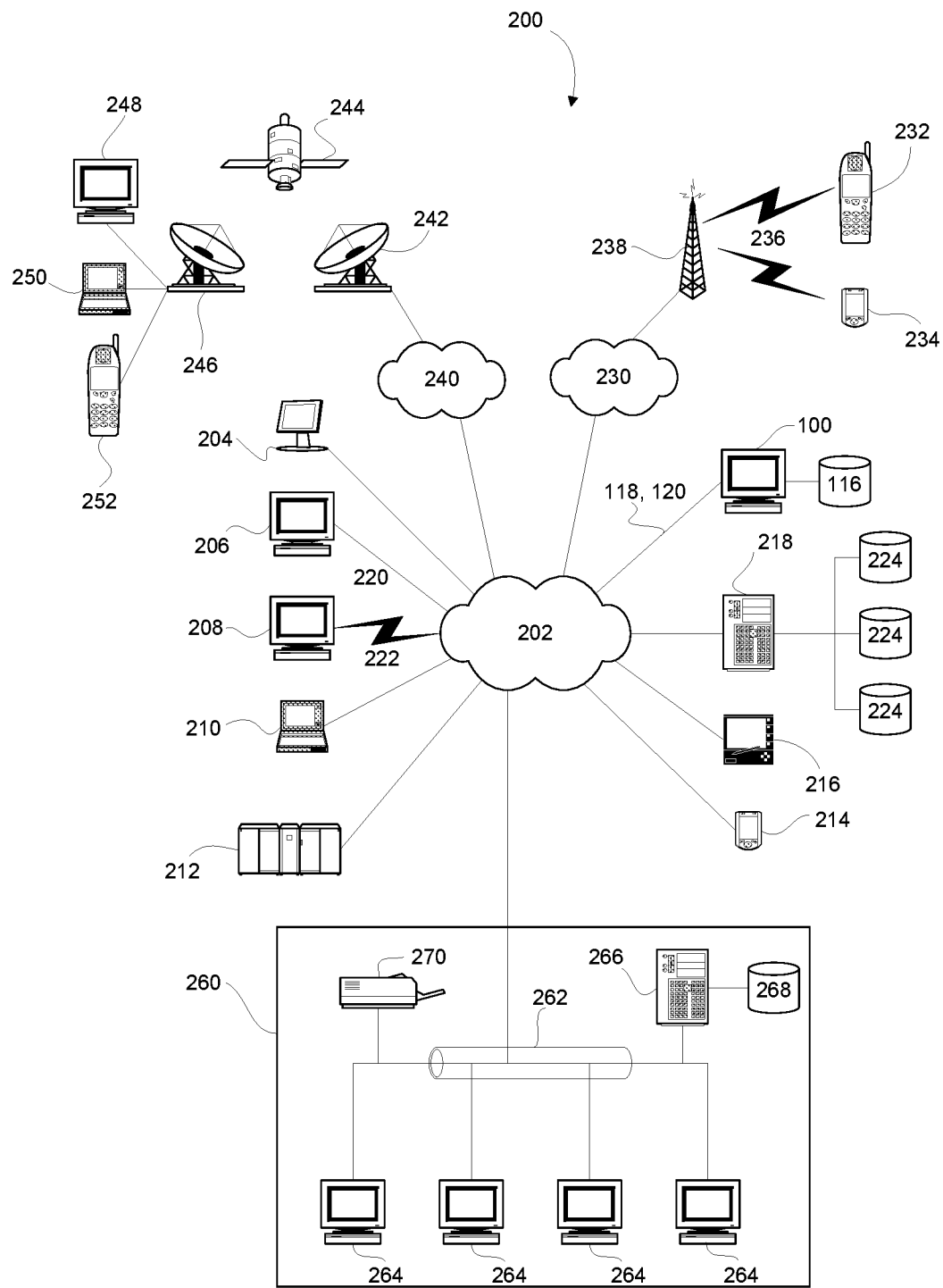
FIG. 2 illustrates an example network infrastructure that can be utilised to embody or give effect to a particular embodiment.

The processing system 100 may be a part of a networked communications system 200, as shown in FIG. 2. Processing system 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with Ethernet 262 which connects terminals 264, server 266 which controls the transfer of data to and/or from database 268, and printer 270. Various other types of networks could be utilised.

The processing system 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Figure 3:
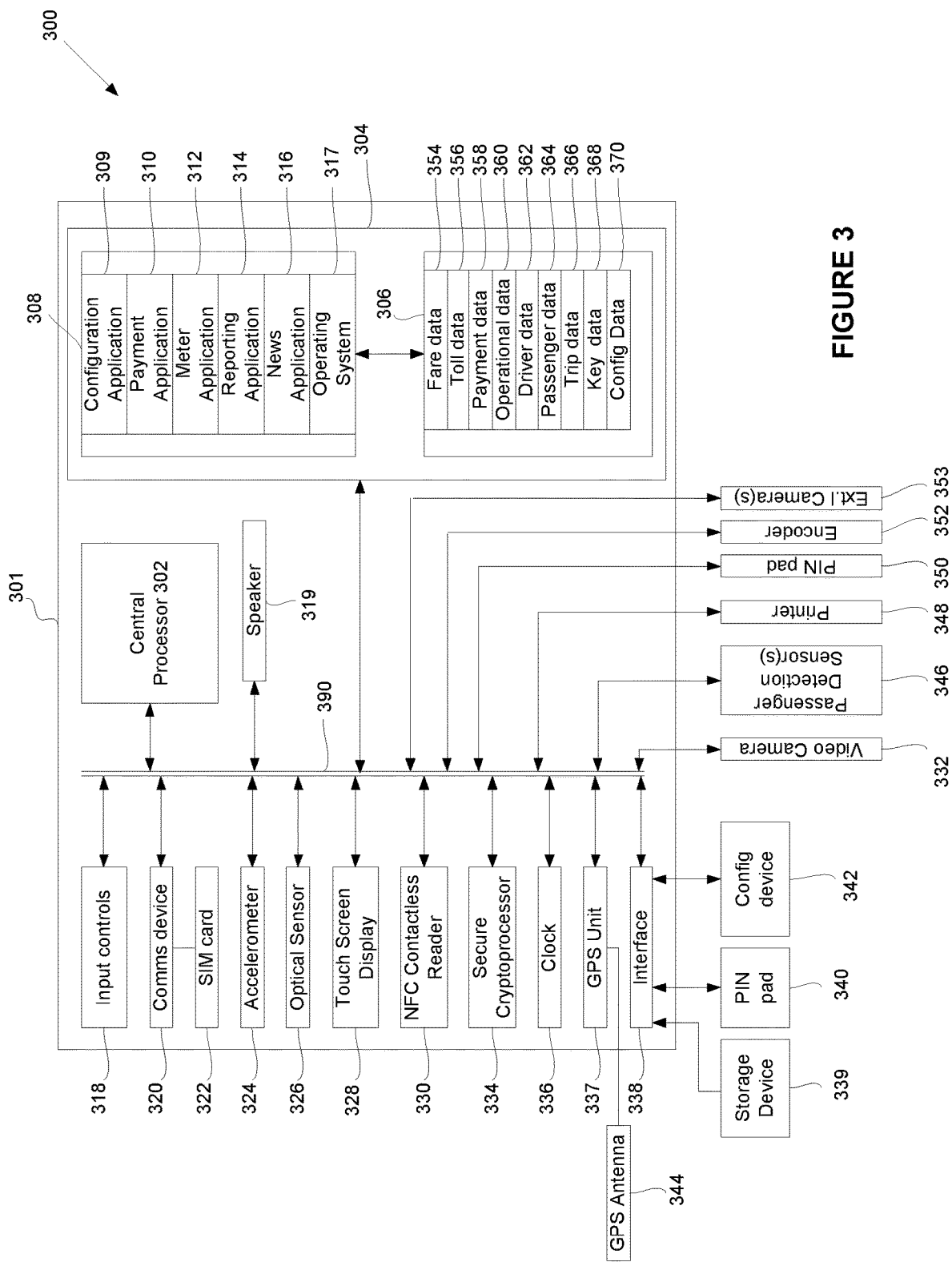
FIG. 3 illustrates an example taximeter for use in a taxi.

Referring to FIG. 3 there is shown a taximeter system 300 including a taximeter 301. The taximeter 301 is configured for installation in the taxi. The taximeter 301 includes a processing system which is substantially based upon processing system 100 discussed in relation to FIG. 1.

Referring more specifically to FIG. 3, the taximeter 301 includes a central processor 302 coupled to a memory 304 via a bus 390. The central processor 302 also includes a number of peripheral devices which are in data communication with to the central processor 302 via the bus 399.

In particular, the peripheral devices that are in communication with the processor 302 include an input control unit 318, one or more communication devices 316 (i.e. transceiver) which can be coupled to a SIM (Subscriber Identification Module) card 314, an accelerometer 324, an optical sensor 326, a touch screen display 328, an NFC (Near Field Communication) reader 330, a secure crypto-processor 334, a clock 336, a geographical positioning unit 337 (utilising the GPS system, the GLONASS unit, the Galileo system, the IRNSS system, and/or the Beidou Navigation Satellite System) and an interface 338. These peripheral devices of the device 301 are integrated within a housing of the taximeter 301 and are thus non-removable peripheral devices.

The taximeter system 300 also includes a number of peripheral devices which are located external to the housing of the taximeter 301. In particular, the taximeter system 300 includes a geographical positioning antenna 344 coupled to the geographical positioning unit 337, one or more passenger detection sensors 346, a printer 348, a PIN pad 350, an encoder 352 for measuring the rotation of one or more of the wheels of the taxi, one or more cameras 353 located external to and mounted upon the taxi, and an video camera 332 located internally within the taxi. It will be appreciated that some of these devices that are located externally of the housing may communicate wirelessly with the processor 302 via the communication device 320 or via a wired communication medium.

A calibration device 342 can be releasably coupled to the taximeter 301 via the interface 338 in order to calibrate the taximeter 301 for the specific taxi. Additionally, an additional PIN pad device 340 can be releasably coupled to the taximeter 301 via the USB interface. Optionally, a storage device 339 can be releasably coupled to the device 301.

The memory 304 of the taximeter 301 includes an application store 308 having stored therein a number of executable applications which can be executed by the processor 302 of the taximeter 301. In particular, the application store 308 includes a configuration application 309, payment application 310, a meter application 312, a reporting application 314, a news application 316 and an operating system 317. The memory 304 also includes a data store 306 which stores therein various data for the taximeter 301. In particular, the data store 306 includes fare data 354, toll data 356, payment data 358, operational data 360, driver data 362, passenger detection data 364, trip data 366, key data 368, and configuration data 370.

Figure 4:
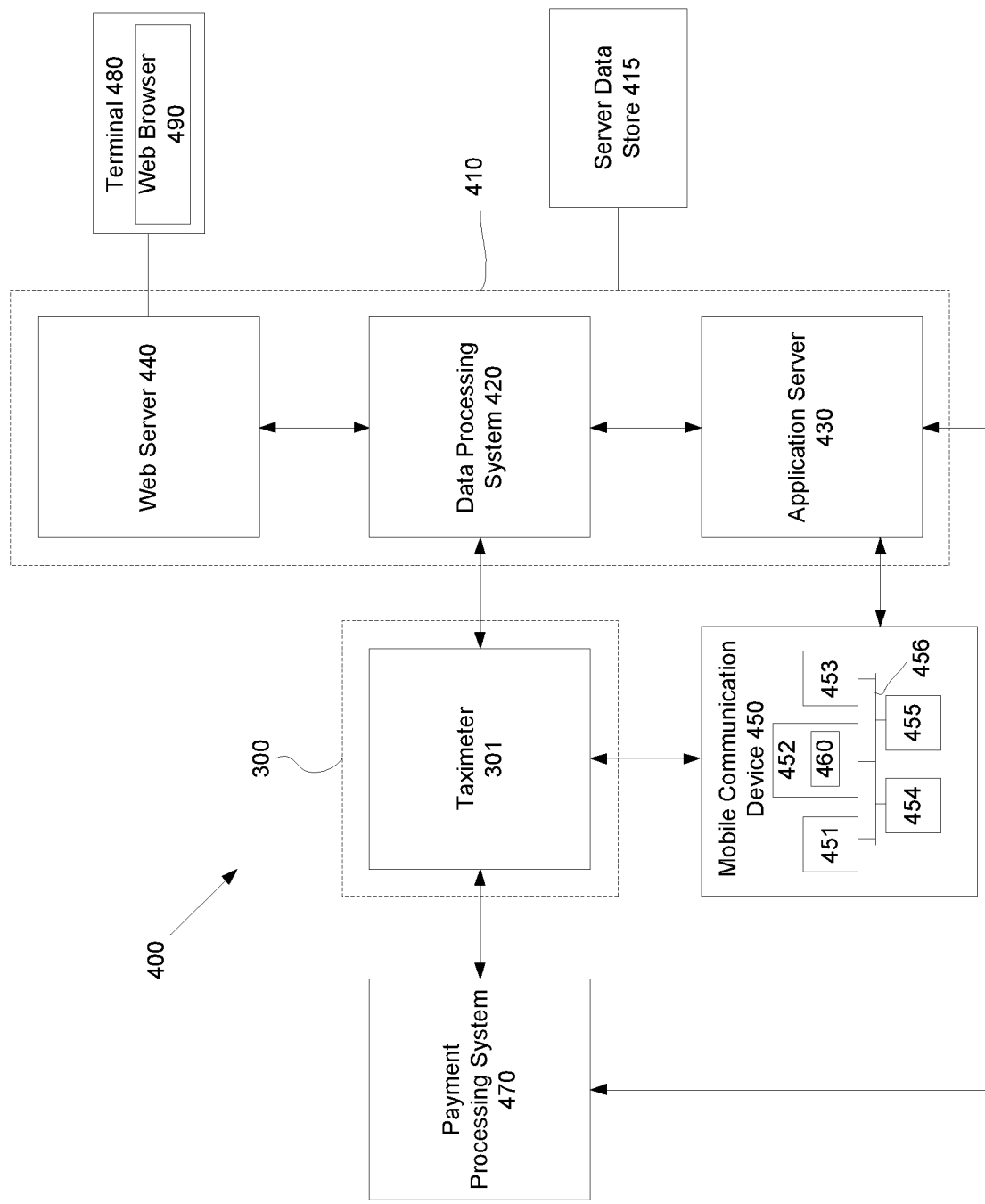
FIG. 4 illustrates an example system for use with the taximeter of FIG. 3.

The taximeter system 300 can be part of a networked system such as that depicted in FIG. 2. In particular, referring to FIG. 4 there is shown a computer network system 400 including the taximeter system 300. The taximeter system 300 is in data communication with a server processing system 410. The communication between the system 300 and the server processing system 410 is generally performed wirelessly using one or more networks wherein the wireless communication device 320 is utilised to enable the wireless communication.

The taximeter system 300 is also in communication with a payment processing system 470 to process financial payment data for completing the payment transaction. Generally, the taximeter system 300 wirelessly communicates with the payment processing system 470 using the wireless communication device 320.

The taximeter system 300 can also be in communication with a mobile communication device 450 associated with the passenger of the taxi. The mobile communication device is preferably provided in the form of a smartphone or tablet processing system. The mobile communication device includes a processor 451, a memory 452, an input device 453, an output device 454, and a transceiver 455 coupled together by a bus 456.

In one particular form, the mobile communication device 450 executes a mobile computer application 460 stored in memory 452 in order to communicate with the taximeter system 300. Generally, communication between the taximeter system 300 and the mobile communication device 460 is performed wirelessly using the wireless communication device(s). Preferably, the data communication is performed using Bluetooth protocol. In one form, the Bluetooth protocol can be Bluetooth Low Energy protocol, however other earlier Bluetooth protocols (i.e. versions 1, 2 or 3) can also be utilised. However, in other variations, the wireless communication device 320 of the taximeter system 300 may be a wireless router which establishes a wireless hotspot using Wi-Fi within the taxi, wherein the mobile communication device 450 can communicate with the system 300 using the wireless hotspot. The mobile communication device 450 can also be in data communication with the server processing system 410 via the computer application 460.

The server processing system 410 includes a data processing system 420 for collecting, transferring and processing data received from the taximeter system 300 as well as other devices of the network 400, an application server 430 to enable communication with the computer application 460 executed by the mobile communication device 460, and a web server 440. The web server 440 enables communication between the server processing system 410 and one or more computer terminals 480 such as a processing system 100, wherein the computer terminals 480 interprets a web-browser application 490 to display information to a user of the computer terminal 480 and to enable communication with the server processing system 410. It will be appreciated that each terminal device 480 is a device that can access a web-page via a wide area network such as the Internet.

The taximeter 301 and taximeter system 300 are configured to receive electrical power from the battery of the taxi.

In use, once the taximeter system 300 is operational by receiving electrical power from the taxi, the taximeter 301 performs a boot-up process wherein the operating system 317 boots up. Once the boot-up process has been completed, the processor 302 controls via the touch screen display 328 to display a user interface of the operating system 317. The taxi driver may be presented with a login interface wherein the taxi driver enters identification data, such as a username and password, to identify the taxi driver. Alternatively, the taxi driver may have associated therewith an NFC enabled device such as a smart card enabled device which can be located by the driver within a reading proximity of the taximeter 301 in order to obtain an identity of the taxi driver. The operating system 317 may authenticate the taxi driver based on local driver data 362 stored in the data store 306 and/or transfer an authentication request to the server processing system 410 for authenticating the taxi driver, wherein a message may be transferred back to the taximeter 301 from the server processing system 410 indicative of the outcome of the authentication such that access to the taximeter 301 is granted or denied.

When a passenger enters the taxi, the taxi driver can interact with the meter application 312 which is executing by the processor 302 to begin recording the fare. The interaction with the meter application 312 can be via the touch screen interface 328. The tactile input controls 318 may alternatively be used by the taxi driver in order to ease the selection process for the taxi driver. Upon interaction, the processor 302 executing the meter application 312 utilises the fare data 354 stored in the data store 306 to calculate the fare for the trip in real time. Generally, the processor 102 executing the meter application 312 uses a combination of rules to determine the fare due during the trip. The fare data 354 includes fare tables which can be updated in the device 301. Generally, the fare that is calculated by processor 102 executing the meter application 312 based on the distance travelled and the time of the trip. The distance travelled is calculated using signals received from the encoder 352 which indicates rotations of the wheels of the taxi. Other factors may also be utilised for calculating the fare. For example, the time or day (i.e. weekday or weekend) which the trip commences may result in a higher or lower fare being applicable. Additionally, as will be discussed in more detail below, any tolls that may be incurred during the trip may also be added to the due amount. The processor 302 executing the meter application 312 presents a meter application interface via the touch screen interface during the trip such that the passenger can be aware of the accruing amount due.

The processor 302 executing the meter application 312 also utilises the toll data 356 to automatically determine tolls that are incurred during the trip. The toll data 356 defines a plurality of associated entry and exit areas for tolled areas of a road network. The entry and exist areas are geographical areas which define when the taxi has entered or exited upon a road which an associated toll. During the trip, data indicative of the time-stamped data geographical coordinates are recorded in the memory 304 periodically by the processor 302 using the geographical positioning unit 337 and geographical positioning antenna 344 and stored in the data store 306 as trip data 366, wherein the trip data 366 stored is associated with an identity for the specific trip for the passenger. The clock 336 may be used for time-stamping geographical coordinates if required, however it is also possible that the geographical coordinates provided to the processor are already time-stamped. Furthermore, the processor 302 can record in memory 304 only a change in geographical coordinates between the most recently obtained geographical coordinate and the most recently recorded geographical coordinate in order to increase the storage capabilities of the memory 304 of the taximeter 301. The processor 302 executing the meter application 312 continuously compares the latest recorded geographical coordinate against one or more of the entry and/or exist areas defined in the toll data 356. In the event the taxi is identified as having passed through an entry area of a tolled area, the processor 302 logs a tolled entry event in the trip data 366 and the time which this entry occurred. The processor executing the meter application 312 then continues to continuously compare a selection of the latest recorded geographical coordinates during the trip against the defined entry and exit areas until there is a detection of the taxi having passed through an exit area of a tolled area. The exit area detected and the time that the taxi passed through the exit area are recorded in the trip data 366. The processor 302 executing the meter application 312 then attempts to match the detected exit area with the previously detected entry area based on the associated entry and exit areas defined in the toll data 356. Each associated entry and exist areas have one or more associated temporal thresholds such as a temporal range which are stored in memory 304 and defines a lower and upper limit as to how long it should take for the taxi to pass between the areas. The processor 302 executing the meter application 312 compares the temporal duration between the taxi passing between the entry and exit areas against the temporal range. In the event that the duration between the detections falls outside the temporal range, the processor 302 executing the meter application 312 dismisses the toll detection. However, in the event that the duration between the detections falls within the temporal range, the processor 302 executing the meter application 312 retrieves from the toll data 356 a toll amount associated with the detected entry and exit areas which is then combined with the accruing amount due for the trip and displayed upon the touch screen display 328. As such, the touch screen display 328 displays in real time the amount accrued from the toll incurred rather than the taxi driver requiring to include this amount with the accrued amount at the end of the trip. The processor 302 executing the meter application 312 may also use the time stamped geographical coordinates to determine a direction which the taxi is travelling to determine whether a toll should be incurred by the passenger (i.e. directional dependent tolls).

In one form, the taximeter's processor 302 compares at least some of the geographical coordinates obtained from the geographical positioning unit 337 against a most recently recorded geographical coordinate stored in the taximeter's memory. In the event that geographical coordinates are substantially similar, the taximeter processor 302 does not record the obtained geographical coordinate in taximeter's memory 304. This configuration is advantageous in order to increase storage capabilities of the memory 304 such that the same or substantially similar geographical coordinate is not recorded in memory a plurality of times in the instance when the taxi is substantially stationary.

At the end of the trip, the taxi driver can input via the tactile input controls 318 or the touch screen display 328 that the trip has ended. In response, the processor 302 executing the meter application 312 stops the calculation of the accruing amount due thereby defining a final due amount. A payment application 310 is then executed by the processor or via input by the taxi driver. The payment application 310 displays an interface indicating the final due calculated by the meter application 312 a number of options for payment by the passenger.

In particular, the passenger may wish to utilise the PIN pad device 340,350 to pay the final amount due. In particular, a financial instrument such as a card including a magnetic stripe or a smart card can be utilised to perform the financial transaction. An input means of the PIN pad device 350 may be utilised to provide a personal identification number to verify the financial transaction although this may not be necessary depending upon the type of transaction. In the event that the taxi is located in an area where the communication device 320 is able to wirelessly communicate with the payment processing system 470, encrypted data is then transferred from the PIN pad device 350 to the secure crypto-processor 334 to process the encrypted financial transaction data which is wirelessly transferred by the communication device 320 to the payment processing system 470 (see FIG. 4, commonly referred to as a "switch"). A message is then received by the taximeter 301 via the communication device 320 indicating whether the financial transaction was successfully processed. A payment record that is recorded by the processor 302 as payment data 358 is then stored in the data store 306 indicative of the financial payment processed, wherein a driver identity is recorded in association with the payment record to identify the driver associated with the transaction. However, in instances where the taxi is located in areas where the communication device 320 is unable to wirelessly communicate with the payment processing system 470, the secure crypto-processor 334 stores the encrypted financial transaction data which can be processed at a later time/date when communication with the payment processing system 470 is available. The encrypted financial transaction data may be associated with an expiration date wherein the financial transaction data must be processed prior to the expiration date.

Another payment option includes allowing the passenger to complete the financial transaction using a NFC enabled device such as a NFC enabled payment card or an NFC enabled mobile communication device 450. In particular, the passenger places the NFC enabled device within a defined proximity of the NFC reader wherein the NFC reader and the NFC transmitter couple such that data is wirelessly transferred from the NFC enabled device to the taximeter 301 for processing by the secure crypto-processor 334.

In another option, the passenger may wish to use a financial payment tool which utilises visual indicia, such as a bar code or the like. For example, a printed coupon/voucher bearing visual indicia may be presented or visual indicia may be displayed upon the passenger's mobile communication device 450. The visual indicia can be scanned by the optical sensor 326 and the taximeter 310 processes the captured visual indicia to facilitate the financial transaction. For example, an identifier may be determined based upon scanned visual indicia by the processor 302 and the identifier is then transferred the payment processing system 470 if available. If communication with the payment processing system 470 is unavailable, the identifier is stored in memory for later processing.

In another option, the passenger may complete the financial transaction using their mobile communication device 450, wherein the processor executes a mobile computer application 460 which communicates with the application server 430 of the server processing system to facilitate the payment. In particular, the passenger may have registered an account with the application server 430. The passenger can launch the application 460 wherein authorisation to pay the amount due and an identity of the taxi, device 301 or trip is transferred to the server application. The passenger can input at least some of these details or the device 301 may wirelessly transfer this data to the application 460 via the communication device 320 such as via Bluetooth or Wi-Fi. When the application server 430 receives the data from the application 460, the application server 430 facilitates the payment of the amount due. In one form, the passenger may have credit associated with the registered account, wherein the application server 430 facilitates the debiting of the credit associated with the passenger. Alternatively, the passenger may have credit card or direct debit data stored in association with the registered account, wherein the application server 430 facilitates the processing of the amount due in combination with the payment processing system 470 using these stored details. In some embodiments, the passenger may require to provide identification data via the mobile communication device 450 such as a username and/or password in order to verify their identity to the application server 430 prior to facilitating the financial transaction. A message is sent from the payment processing system 470 to the application server 430 indicative of whether the transaction was successful. The message is then transferred to the taximeter 301 via the data processing system 420 using the identity of the taxi or the device 301 in order to display via the touch screen display the result of the transaction. The application server 430 also transfers an indication of the result of the transaction to the application 460 of the mobile communication device 450.

In another option, the passenger may utilise the application 460 of the mobile communication device 450 to establish a wireless data communication session with the device 301 of the taxi, wherein the device 301 receives payment authorisation data from the mobile communication device operated by the passenger. As discussed above, the passenger has an account registered with the application server 430. The application 460 receives one or more authorisation data objects from the application server 430. Each authorisation data object is effectively a virtual payment instrument which provides the passenger authorisation to debit the passenger's account maintained by the server processing system. When the passenger is required to pay a fare, one of the authorisation data objects can be transferred from the mobile communication device 450 to the taximeter 301, whereby the taximeter 301 can arrange for the passenger's account to be debited the fare based on the authorisation data object.

Each authorisation data object is indicative of the passenger's account with the server processing system 410. Additionally, each authorisation data object can be indicative of an expiration deadline. Each authorisation data object is preferably encrypted by the server processing system 410. The server processing system 410 maintains, in the server data store 415, data indicative of the authorisation data objects issued to each passenger.

The application 460 may automatically receive one or more authorisation data objects from application server 430 when the application 460 is launched by the passenger and the application 460 is able to establish a data communication connection with the application server 430. It will be appreciated that the passenger may require to be identified (user name and password, and/or biometric). Alternatively, the passenger can interact with the application 460 to send a request to receive one or more authorisation data objects. The authorisation data objects are stored in the memory 452 of the mobile communication device 450. The processor 451 executing the application 460 can store the authorisation data objects in a queue data structure, wherein the oldest authorisation data object is stored at the start of the queue (i.e. First In First Out data structure). When an authorisation data object is to be used, the oldest authorisation data object is transferred to the taximeter 301 to authorise the payment.

When the passenger approves payment of the fare due via the application 460 which is executing by the processor 451, an authorisation data object is retrieved by the processor 451 from the memory 452 of the mobile communication device 450 and transferred to the taximeter 301. The used authorisation data object is then purged from authorisation data object queue. Preferably, the transferred authorisation data object is encrypted. The taximeter 301 then decrypts the authorisation data object and performs a temporal validation process to determine whether the authorisation data object is temporally valid. In particular, the taximeter 301 compares the expiration deadline indicated by the authorisation data object against the current time indicated by the clock 336. In the event that the authorisation data object has expired, the taximeter 301 transfers an expiration message to the mobile communication device 450 requesting a further authorisation data object to be provided to the device which is temporally valid.

Once a temporally valid authorisation data object has been identified by the taximeter 301, the taximeter 301 may forward the authorisation data object to the server processing system 410 for processing, such that the passenger's account is debited accordingly. The server processing system 410 updates the server data store 415 to record that one of the authorisation data objects issued to the passenger has been used. A transaction message may be received from the server processing system 410 by the taximeter indicating whether the transaction has been successfully completed, wherein the taximeter 301 presents the transaction message via the display 328.

In particular situations, the taximeter 301 may not be able to establish a data communication connection with the server processing system 410 (i.e. due to poor reception). Alternatively, the taximeter 301 may be configured to simply request processing of the authorisation data object at a later time when a secure data connection can be established between the taximeter 301 and the server processing system 410. In these instances, the processor 302 of the taximeter 301 stores the authorisation data object in memory 306 such that the authorisation data object can be processed at a later time. In these situations, the transaction is presumed to be valid (upon successful analysis of the deadline of the authorisation data object), and a successful payment indication is presented by the taximeter 301 via the display 328.

In this example where the passenger's mobile communication device 450 establishes a wireless data communication session with the taximeter 301, it is important that the mobile communication device 450 establishes the wireless data communication session with the correct taximeter 301, otherwise a different passenger's fare could be paid by the respective passenger. This problem is particularly an issue at areas such as taxi ranks and areas where customers continuously drop off passengers (i.e. airports) due to the number of taximeters within a wireless proximity of the mobile communication device 450. To overcome this problem, the processor 451 of the mobile device 450 filters a list of wireless devices according to a taxi network identifier and then discriminates between a list of the remaining wireless devices based at least upon a received signal strength indicator for each wireless device.

In particular, each advertising message received by the mobile device 450 includes a device identifier, such as a UUID, which can be indicative of the taxi network identifier. The mobile device 450 has stored in memory the taxi network identifier, wherein each wireless device in the list is analysed to determine if it includes the taxi network identifier. Advertising messages for wireless devices which are not indicative of the taxi network identifier are removed from the list.

The mobile device 450 then transfers a request to each remaining wireless device to request one or more attributes. One of the attributes requested can be an operating status code which is indicative of a status of the wireless device 301. Examples of status codes are provided below:

| Status Code | Status |
| --- | --- |
| FP | Fare paid |
| MR | Meter running |
| NH | Not for hire |
| DA | Device attached |
| PN | Pay Now |
| VA | Vacant |

The status code can be used by the processor 451 of the mobile device 450 executing the application to further filter the list. In particular, the application 450 deletes from the list responses from devices which do not have a status code indicative of a meter running (MR) or a payment being due (PN).

Once the filtering process has been performed by the application 460 which is being executed by the processor 451, the list may include only a single wireless device in the list of wireless devices. In this case, a wireless connection, such as a Bluetooth connection, can be established automatically between the mobile communication device 450 and the wireless device which is the taximeter 301. Alternatively, the passenger may be required to confirm the establishment of the connection via the application 450 using the input device of the mobile device 450. Once the connection has been established, details of the trip can be transferred from the taximeter 301 to the application 450 for presentation to the passenger. The passenger can then select to pay the fare due as discussed above, wherein an authorisation data object is transferred to the taximeter 301 for authorising payment as discussed above.

In certain circumstances where multiple taxis are be located within the wireless proximity (i.e at a drop-off point of an airport), the filtered list of responding devices may still include more than one potential device which could be the taximeter 301. In these circumstances, the processor 451 executing the application 460 determines a received signal strength indicator for each wireless device. The processor executing the application then discriminates between the plurality wireless devices based upon the received signal strength indicators to determine one of the wireless devices as the taximeter 301. For example, each received signal strength indicator can be compared to received signal strength indicator thresholds stored in memory 452. Alternatively, a score may be calculated by the processor 451 of the mobile device 450 using the determined received signal strength indicator for each wireless device in the filtered list. The processor 451 executing the application 460 then facilitates in establishing the wireless data communication session with the wireless device determined as the taximeter 301 in order to enable the passenger to authorise payment of the fare due via the mobile device 450.

The processor 451 of the mobile device 450 executing the application 460 can also determine a transmitting power level for each wireless device in aiding in the discrimination process. For example, the transmitting power level may be stored in memory 452 of the mobile device 450, wherein the processor 451 retrieves the transmitting power level from memory 452. Alternatively, the mobile device 450 may transfer a request to each wireless device requesting the respective transmitting power level, wherein each wireless device responds transferring data indicative of the transmitting power level to the mobile device 450. In one form, the mobile device 450 executing the application 460 determines a calibrated transmitting power level for each wireless device in aiding in the discrimination process. For example, the response may include a calibrated transmitting power level or a calibration factor which can be used by the processor 451 of the mobile device 450 to determine the calibrated transmitting power level. Due to particular taximeters and the associated antennas being installed in taxis in various locations, certain taximeters will be more effective in transmitting wireless data than others and thus the received signal strength and the transmitting power level may need to be adjusted to accurately discriminate amongst the plurality of wireless devices to determine the taximeter 301. To address this issue, the taximeter 301 has stored in memory data indicative of the calibration factor to adjust the reported transmitting power level of the taximeter 301, or alternatively the taximeter 301 can have stored in memory 304 the reportable calibrated transmitting power level. The processor 451 of the mobile device 450 can then use the reported calibrated transmitting power level and the received signal strength indicator for each wireless device (such as comparisons to one or more thresholds) to identify which wireless device is the taximeter 301.

Additionally or alternatively, the mobile device's processor 451 logs in the mobile device's memory 452 data indicative of advertisement messages received from the plurality of wireless devices and a time which at least some of the advertisement messages were received by the mobile device 450. The processor 451 of the mobile device 450 can determine a period of time which each wireless device has been broadcasting to the mobile device 450 and use these periods of time to determine which wireless device is likely to be the taximeter 301. For example, for a list of two wireless devices, the processor 451 of the mobile device 450 may identify that one wireless device has only been broadcasting for one minute whereas the other wireless device has been broadcasting for at least five minutes. Based on this comparison, the wireless device which has been broadcasting for five minutes is identified as being more likely to be the taximeter 301 for the passenger due to advertisement messages being received throughout the trip.

The processor 451 executing the application 460 may apply one or more scoring rules which are stored in memory 452 to each wireless device in the filtered device list to determine a weighted score for each device. The weighted score for each device is then used by the processor 451 to order the filtered device list, wherein the device with the highest (or most favourable) weighted score is considered by the processor 451 the most likely to be taximeter 301 associated with the passenger's taxi.

An example list of scoring rules with an associated weighted score are provided below.

| Scoring Rule | Score |
| --- | --- |
| The mobile communication device has received advertising messages from with the respective wireless device over a threshold period of time (i.e. 5 mins) | 10 |
| Highest strength signal | 5 |
| Status is PN (pay now) | 4 |

Preferably, using the scoring rules, the processor 451 of the mobile device 450 is able to identify the wireless device as the taximeter 301 and autonomously facilitate in establishing a secure wireless data communication session with the taximeter. As discussed above, the wireless data communication session may be established using Bluetooth protocol. Authorisation of the payment can then be performed as discussed above in relation to the transfer of an authorisation data object to the device 301.

Alternatively, the processor 450 executing the application 460 presents the ranked device list such that the device with the highest weighted score is graphically larger on the application interface than the other device(s) in the ranked filtered device list. For example, a larger confirmation button may be presented in relation to the device with the highest weighted score, thereby indicating that the respective device is considered the most likely to be taximeter 301. Once input has been received from the passenger indicating which device in the ranked filtered device list is taximeter 301, the wireless data communication session is established between the taximeter 301 and mobile communication device 450. Authorisation of the payment can then be performed as discussed above in relation to the transfer of an authorisation data object to the device 301.

Upon completion of the financial transaction a receipt is provided to the passenger. In one form, a physical receipt is printed using the printer 348. The printed receipt may include a trip identifier which can be used by the passenger using a terminal 480 to retrieve an electronic receipt including additional information about the trip. In particular, the passenger can access a passenger portal via a web browser 490 wherein the passenger can input the trip identifier which is transferred to the web-server 440. The web-server 440 then queries the server data store 415 to retrieve trip data 366 and associated payment data 358 for the trip identified by the trip identifier. A visual representation of the trip data 366 may be generated by the server processing system 410 in the form of a map indicative of the start point of the trip, the end point of the trip and the route, wherein the map is presented as part of the electronic receipt. The amount charged for the trip is also retrieved as well as an indication of tolls incurred and optionally the rates that were applied, wherein this additional information is presented as part of the electronic receipt.

In another form, the electronic receipt can be retrieved via the mobile communication device 450 if payment was made via the application 460. In particular, upon payment, a receipt section of the application 460 can be selected by the passenger, wherein a list of receipts for paid trips is displayed. The passenger can select one of the trips via the application 460 wherein a receipt request indicative of the identity of the trip is transferred by the processor 451 via the transceiver to the application server 430. Similarly to the above situation, additional information associated with the trip is retrieved from the server data store 415 and transferred back to the mobile communication device 450 for display within the interface of the application 460. Alternatively, when payment of a trip is completed, the electronic receipt is transferred for storage by the mobile communication device 450 such that a receipt request does not need to be transferred to the server processing system 410 in the future.

In another embodiment, the application 460 can enable a user to review the route taken by the taxi driver prior to completing the financial transaction. In one form, the taxi driver can interact with the device 301 via the touch screen display 328 or controls 318 to issue a route review request in order to present the trip data 366, or a representation thereof, via the touch screen display 328. In particular, a map may be generated or requested by the processor 301 from a third party processing system indicative of the route indicated by the trip. In another form, the route review request is transferred from the mobile communication device 450 associated with passenger to the server processing system 410 to retrieve the trip data 366 associated with the trip. Alternatively, the mobile communication device 450 may communicate with the device 301 to retrieve the trip data 366. A map can then presented via the application 460 to enable the passenger to review the route to ensure that the taxi driver has taken the appropriate route. It will be appreciated that the passenger can view the route in real time via the application 460 during the trip. Additionally, the fare being calculated by the meter application 312 of the taximeter can be presented by the application 460 in real time via wireless communication between the mobile device 450 and the taximeter 301.

In the event of a visually impaired passenger, audio output may be provided by the taximeter 301. In particular, the taximeter 301 includes a speaker 319 to emit audio output indicative of the amount due for the fare and optionally components of the fare (tolls, fare rates, etc). Additionally, the speaker 319 may emit audio output indicative of the route taken based upon the trip data 366. If the passenger utilises the mobile communication device 450, audio output may be emitted from the mobile communication device 450 under control from the application 460 indicating the fare due and/or the route taken for the trip.

Periodically, the taximeter 301 can transfer the trip data recorded in memory 304 to the server processing system 410 for storage. This transfer can be performed wirelessly. Upon successful transfer, the taximeter 301 can purge the trip data from memory 304 in order to provide additional storage space for further routes.

The accelerometer 324 of the device 301 can be used to detect the proper acceleration experienced by the taximeter 301 located within the taxi. The proper acceleration may be sensed periodically and recorded periodically by the taximeter 301 or optionally only instances of the proper acceleration exceeding a proper acceleration threshold are recorded as part of the operational data 360. The proper acceleration can be used by the server processing system 410 to determine unusual driving events such as a crash or erratic driving by the taxi driver. This data can be accessed by an owner of the taxi, or another authorised operator operating a computer terminal 480 which is in communication with the web-server 440 of the server processing system 410.

Additionally, the processor 302 of the taximeter 301 can use the proper acceleration sensed by the accelerometer 324 to control operation of the one or more external cameras 353 and also the storage of image/video data captured by the external cameras 353. In particular, in the event of an accident which the taxi is involved in, image/video data can be stored in memory of the taximeter 301 such that this data can be later used for determining fault of an accident. The rate of capture of image/video data can be increased by the processor 302 in response to detecting that the proper acceleration has exceeded a threshold indicative of an accident.

The processor 302 of the taximeter 301 is operable to perform a calibration check process using the geographical locations obtained by the geographical positioning unit and the encoder signals received from the encoder are accurate. The calibration check process can be scheduled to be performed by the taximeter or it can be performed on demand by receiving a calibration request from the server processing system. In particular, the taximeter 301 has stored in memory 304 an encoder calibration value indicative of the distance travelled per pulse received from the encoder. The encoder calibration value is used by the processor 302 of the taximeter 301 to calculate a distance travelled using the encoder signals received, wherein an encoder dependent distance in stored in memory 304 of the taximeter. The processor 302 also uses the geographical coordinates to determine the distance travelled, wherein a geographical positioning unit dependent distance is stored in memory 304 of the taximeter. The processor 302 then determines the discrepancy between the distances for a period of time. The processor 302 then determines whether the discrepancy equals or exceeds a discrepancy threshold set in memory of the taximeter, wherein in response to a positive outcome the processor 302 determines that the respective taximeter system 300 requires re-calibration. In this instance, the processor 302 controls the display to present a message indicating that the taximeter is due for recalibration. Additionally, recalibration data is transferred by the taximeter 301 to the server processing system indicating that the recalibration of the respective taximeter system 300 is required. The taxi can be returned by the driver to a taxi depot for recalibration. The processor 304 can be configured to compare the distances which are not temporally associated with proper acceleration data indicating that the proper acceleration of the taxi exceeded an acceleration threshold in order to provide accuracy when calculating and comparing the distances. In certain embodiments, the processor 302 can be configured to prevent the meter application being able to operate (i.e. determine a fare due) after determining that recalibration is required in order to force the driver to return the taxi for calibration. In certain embodiments, the processor 302 can be configured to prevent the meter application being able to operate after a temporal threshold stored in memory 304 after the taximeter 301 has determined that recalibration is required.

The taximeter 301 can be configured to perform a self calibration process in order to determine the encoder calibration value which is stored in memory 304. In particular, the processor determines based on the geographical coordinates a distance travelled and then divides the distance by the number of encoder pulses received from the encoder over this period of time to determine the encoder calibration value which is stored in the memory 304. The self calibration process may be a schedule task which the taximeter 301 performs.

In an alternative arrangement, the server processing system can be configured to undertake the calibration check process for each taximeter system 300 in the taxi fleet. In particular, the geographical coordinate data, accelerometer data and distance data calculated by the taximeter 301 based on the encoder signals are transferred by each taximeter 301 to the server processing system. The server processing system then performs the same check process described above to determine a discrepancy between the distance the taxi has travelled based on the geographical coordinate data, and the distance travelled based on the encoder signals. In the event that the server processing system detects a discrepancy which exceeds a discrepancy threshold stored in memory of the server processing system, the server processing system determines that the respective taximeter system 300 requires recalibration. As a result, the server processing system transfers a request to the respective taximeter 301 indicating that recalibration is required as discussed above.

As previously discussed, the geographical positioning unit 337 can be utilised to determine whether a toll should be incurred by the passenger. The geographical positioning unit 337 is configured to periodically detect a current location of the taxi whilst the taximeter 301 is operational. Time-stamped geographical coordinates are stored as part of the operational data 360 recorded in the data store 306. Time-stamped geographical coordinates which are stored may also be associated with a trip identity in the trip data 336 in order to identify the route which the taxi driver took for the passenger.

The taximeter 301 can be updated through use of a portable configuration device 342 which couples to the interface 338. The configuration device 342 is generally used by authorised personnel provided with the task of configuring the device 301 and system 300. Generally, the configuration device 342 is a USB storage device although other types of portable storage mediums can be utilised. The configuration device 342 can have stored therein one or more cryptographic keys for authentication purposes such that the device 301 is placed in a configuration mode thereby allowing the taximeter 301 to be configured or reconfigured. Optionally, the configuration device 342 may include fare data to update the taximeter 301. during the configuration process, the authorised personnel can determine, using configuration equipment, the effectiveness of the antenna of the taximeter for wirelessly transferring data to a mobile device 450 located within the taxi. As previously discussed, the location of the antenna within the taxi can have a large impact on the discrimination process for identifying the taximeter 301. The authorised personnel can then store the calibration factor in the memory 304 of the taximeter 301.

The taximeter 301 has stored in the data store 306 one or more corresponding cryptographic keys 368. Upon coupling the configuration device 342 to the interface 338 of the taximeter 301, the operating system 317 performs an authentication process using the cryptographic keys of the configuration device 342 and those stored in the data store 306. Upon successful authentication, the operation system 317 launches the configuration application 309 wherein a configuration interface is displayed upon the touch screen display 328. The authorised personnel can then interact with the configuration application 309 to update the fare data 354 currently stored in the data store 306 with new fare data which may be stored on the calibration device 342 or located remotely at a remote storage device such as server data store 415.

In addition, the configuration application 309 enables the authorised personnel to calibrate the taximeter 301 and taximeter system 300. For example, the configuration data 370 stored in the data store may be updated to indicate the distance travelled between signals received from the encoder 352. Once configuration has been completed, the authorised personnel can close the configuration application 309. Alternatively, the authorised personnel can disconnect the configuration device 342 from the USB interface 338, wherein the operating system 317 detects the disconnection and automatically closes the configuration application 309.

The device 410 can also be configured remotely via the server processing system 410 wherein configuration data or instructions can be transferred from the server processing system 410 to the taximeter 301 for updating the configuration data 370 stored in the data store 306. In particular, the server processing system 410 has one or more cryptographic keys which are used by the taximeter 301 to perform the mutual authentication process such that the taximeter 301 is placed in the configuration mode. The server processing system 410 can then transfer new fare data to the device 301 to replace old fare data stored in the device's memory 306.

A storage device 339, such as a USB storage device, can be coupled by the taxi driver to the interface 338 in order to copy at least a portion of the data stored in the data store 306. In particular, the taxi driver may wish to keep a copy of the trips and payments made whilst operating the taxi for a particular shift. The taxi driver couples the USB storage device 339 to the interface 338 and then interacts with the touch screen device to select the data to be copied to the USB storage device 339. The reporting application 314 can be used to perform this task, wherein the reporting application 314 may indicate the data stored in the 306 which the driver can copy. It is preferable that the reporting application 314 only allows a portion of the data 306 to be copied as particular data may not be appropriate for the taxi driver. For example, payment data and/or trip data associated with the taxi driver may be copied to the USB storage device 339 by the reporting application 314.

Whilst the device 301 is operational, the reporting application 314 transfers various data from the data store 306 to the server processing system 410, wherein the server processing system 410 records this data in the server data store 415. In some forms, the reporting application 314 periodically transfers the data to the server processing system 410. For example, the payment data 358 associated with the current taxi driver, operational data 360, detection data 372 and trip data 366 may be transferred to the server processing system 410. Generally, only new records that have not been previously transferred are sent to the server processing system 410 by the reporting application 314.

During a trip for a passenger, the taximeter 301 can receive a video feed from the video camera 332 of the system 300. The device 301 displays on the touch screen display 328, simultaneously with the meter interface of the meter application 312, a video frame indicative of the video feed. The video feed acts as a deterrent to passengers to refrain from performing an illegal act such as assaulting the taxi driver or exiting the tax without payment. The processor 302 may store in the data store 306 at least a portion of the video feed.

The passenger detection sensor(s) 346 can be used to detect when a passenger enters or exits the taxi. In one form, the passenger detection sensor(s) 346 may be one or more door latch sensors to sense when the door of the taxi is opened or closed. The passenger detection sensor(s) 346 may additionally or alternatively be one or more pressure sensors for sensing pressure upon passenger seats in the taxi. The processor 302 uses the one or more signals received from the pressure detection sensor(s) to determine if a passenger is in the taxi. Upon positive determination, the processor 302 stores in the data store 304 an instance and time of the detection as detection data 364. The detection data 364 can be reported back to the server processing system and can be used in combination with the operational data 360 and the payment data 358 to audit whether free trips are being provided by the taxi driver.

Whilst the taximeter 301 is operational, the communication device 320 measures and stores signal strength data indicative of GPRS signal strength of one or more communication networks. The signal strength data is stored as part of the operational data 360 which is periodically transferred from the device 301 to the server processing system 410 for storage in the server data store 415.

The secure crypto-processor 334 of the device 301 is configured with an anti-tamper assembly. In particular, in the event that the housing of the taximeter 301 is opened, the anti-tamper assembly is actuated causing the secure crypto-processor 334 to dump all data from memory to ensure that secure keys are not used for fraudulent purposes. The anti-tamper assembly includes a battery used to actuate the dumping of the data from memory.

During the trip the passenger can arrange for prepayment prior to reaching the destination. In particular, the passenger may utilise the application 460 of the mobile communication device 450 to arrange for automatic prepayment. Authorisation data is transferred to the server processing system 410 (potentially via the taximeter 301) from the mobile communication device 450 to authenticate the payment of the final amount due calculated by the taximeter 301. Additionally, the authorisation data may be indicative of a destination point or area to ensure that the trip is recorded as ending by the taximeter 301 in the event that the taxi driver does not record the trip as having ended. When authorisation has been received by the server processing system 410, a confirmation message is transferred from the server processing system 410 to the taximeter 301 to indicate to the taxi driver, via the touch screen display 328, that prepayment authorisation has been received. Additionally, a confirmation message is transferred to the mobile communication device 450 via the application 460 indicating the prepayment arrangement and a trip identifier which can be used to obtain a copy of an electronic receipt in the future. Upon reaching the destination, the taxi driver interacts with the device 301 via the touch screen display 328 or the controls 318 to record the end of the trip. The total due amount is transferred from the taximeter 301 to the server processing system 410, due to the prepayment being authorised, wherein the server processing system 410 facilitates the payment accordingly which may include transferring a payment request to the payment processing system 470 if required. Due to the prepayment arrangement, the taximeter 301 records the amount due in the payment data 358 in the data store. The passenger can use the trip identifier indicated in response to the confirmation of prepayment to obtain a copy of the electronic receipt. This may be achieved via the application 460 or via a terminal 480 as previously discussed. It will be appreciated that the prepayment arrangement can be directly arranged between the taximeter 301 and the mobile device 450. In particular, authorisation data is transferred from the mobile device 450 to the taximeter in relation to the prepayment arrangement. Upon the destination being reached, the total amount due is then transferred to the server processing system 410 for processing.

The taximeter 301 also has stored in memory 304 a news application 316. The news application 316 includes an interface which is presented simultaneously whilst the meter application 312 is operating. The news application 316 presents recent news information accessed from either the server processing system 410 or a third party processing system. The news application 316 may be presented in the form of a news ticker.

The taximeter 301 can have an additional PIN pad 340 releasably coupled thereto via the interface 338. Specifically, particular taxi operators may wish to process other financial instruments which PIN pad 350 may be unable to process. As such, the interface 338 enables a second or alternate PIN pad 340 to be releasably coupled to the device 301 in order to process other financial instruments.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The present invention may take the form of an entirely hardware embodiment, an entirely software embodiment, firmware, or an embodiment combining software and hardware aspects.

The invention claimed is:

1. A taximeter for use in a taxi, wherein the taximeter comprises:
   a processing system, integrated within a housing of the taximeter, including a memory having stored therein a plurality of computer applications, wherein the processing system is configured to:
   execute a meter application during a passenger trip to determine a fare due; and
   execute a payment application to facilitate electronic payment of the fare due,
   one or more sensors, integrated with the housing and in communication with the processing system, wherein the memory is arranged to store operational data indicative of sensed signals received by the one or more sensors and communicated to the processor system;
   one or more communication devices, integrated with the housing and configured to facilitate wireless communication;
   a secure crypto-processor, integrated within the housing, and configured to facilitate processing of electronic payment of the fare; and an anti-tamper assembly which is actuable upon the housing of the taximeter being opened to prevent unauthorized access to cryptographic keys used by the secure crypto-processor,
wherein the taximeter is configured to receive electrical power from the taxi,
wherein at least one of the one or more communication devices is further configured to establish a direct data communication connection with a mobile device associated with a passenger which is used to facilitate payment of the fare due and, after the data communication connection is established, the taximeter is configured to receive, via the direct data communication connection, an authorization data object from the mobile device authorizing payment of the fare due, the authorization data object associated with an account associated with the passenger, and
wherein the taximeter is further configured, after receiving the authorization data object, when at least one of the one or more communication devices are able to wirelessly communicate with a remote server, to cause the account of the passenger to be debited according to the fare due, and when the one or more communication devices are unable to wirelessly communicate with the remote server, the secure crypto-processor stores the authorization data object to be processed at a later time when a wireless connection to the remote server is available.

2. The taximeter according to claim 1, wherein the one or more sensors include an accelerometer, wherein the operational data is indicative of a proper acceleration of the taximeter in the taxi, and wherein the operational data is indicative of the proper acceleration of the taximeter which is greater than a proper acceleration threshold.

3. The taximeter according to claim 1, wherein the one or more communication devices include a NFC reader which is operable to communicate with a NFC enabled device.

4. The taximeter according to claim 1, wherein the secure crypto-processor is configured, upon the housing of the taximeter being opened, to dump cryptographic keys from the memory.

5. The taximeter according to claim 3, wherein the NFC reader is configured to communicate with a payment instrument including a NFC chip, wherein the payment application is configured to facilitate payment of the fare due based upon the data sensed from the payment instrument.

6. The taximeter according to claim 1, wherein the taximeter includes an optical sensor configured to scan indicia indicative of a payment request, wherein the payment application is configured to use the payment request to facilitate electronic payment of the fare due.

7. The taximeter according to claim 1 wherein the authorization data object is indicative of an expiration deadline, wherein the taximeter is configured to perform a validation of the authorization data object based on the expiration deadline to determine if the authorization data object has expired, and in the event of the authorization data object has expired, to transfer data to the mobile device indicating that the authorization data object has expired.

8. A system including:
the taximeter according to claim 1; and
the remote server in data communication with the taximeter, wherein the remote server has access to a server data store having stored therein trip data and payment data recorded by the taximeter, wherein the remote server is configured to:
receive a request for an electronic receipt relating to a trip from a requesting device; and
transfer to the requesting device an electronic receipt indicative of the trip data and payment data associated with the trip, wherein the trip data and payment data are retrieved from the server data store.

9. The system according to claim 8, wherein the electronic receipt is indicative of the route of the trip.

10. The system according to claim 8, wherein the system includes a mobile application executed upon the mobile device associated with the passenger, wherein the passenger interacts with the mobile application to facilitate payment of the fare due, wherein the mobile device, under control of the mobile application, communicates with at least one of the taximeter and the remote server to facilitate payment of the fare.

11. The system according to claim 10, wherein the mobile device is configured by the mobile application to:
generate, based upon received wireless signals, a list of a plurality wireless devices able to communicate with the mobile device;
determine a received signal strength indicator for each wireless device;
discriminate between the plurality wireless devices based upon the received signal strength indicators to determine one of the wireless devices as the taximeter; and
facilitate in establishing a wireless data communication session with the wireless device determined as the taximeter in order to enable the passenger to authorize payment of the fare due via the mobile device.

12. The system according to claim 11, wherein the mobile device is configured by the mobile application to:
determine a transmitting power level for each wireless device; and
discriminate between the plurality of wireless devices further using the transmitting power level for each wireless device to determine one of the wireless device as the taximeter.

13. The system according to claim 11, wherein the mobile device is configured by the mobile application to:
determine a calibrated transmitting power level for each wireless device; and
discriminate between the plurality of wireless devices further using the calibrated transmitting power level for each wireless device to determine one of the wireless device as the taximeter.

14. The system according to claim 8, wherein the authorization data object is indicative of an expiration deadline, wherein the taximeter performs a validation of the authorization data object based on the expiration deadline to determine if the authorization data object has expired, and in the event of the authorization data object has expired, transferring data to the mobile device indicating that the authorization data object has expired.

* * * * *